United States Patent
Li et al.

(10) Patent No.: US 10,439,930 B2
(45) Date of Patent: Oct. 8, 2019

(54) PACKET BATCH PROCESSING WITH GRAPH-PATH BASED PRE-CLASSIFICATION

(71) Applicant: Futurewei Technologies, Inc., Plano, TX (US)

(72) Inventors: Ming Li, Cupertino, CA (US);
Katherine Zhao, San Jose, CA (US);
Jun Liu, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 87 days.

(21) Appl. No.: 15/498,136

(22) Filed: Apr. 26, 2017

(65) Prior Publication Data

US 2018/0316609 A1    Nov. 1, 2018

(51) Int. Cl.
*H04L 12/801* (2013.01)
*H04L 12/26* (2006.01)
*H04L 12/751* (2013.01)
*H04L 12/28* (2006.01)
*H04L 12/721* (2013.01)
(Continued)

(52) U.S. Cl.
CPC ............ *H04L 45/34* (2013.01); *H04L 45/741* (2013.01); *H04L 12/66* (2013.01); *H04L 45/22* (2013.01); *H04L 45/42* (2013.01)

(58) Field of Classification Search
CPC ....... H04L 45/34; H04L 45/741; H04L 45/22; H04L 35/306; H04L 45/30
See application file for complete search history.

(56) References Cited

U.S. PATENT DOCUMENTS 10,037,617 B2 * 7/2018 Ebtekar ................. G06T 11/206
2008/0273878 A1   11/2008 Wu et al.
(Continued)

FOREIGN PATENT DOCUMENTS

| CN | 1859283 A | 11/2006 |
| CN | 1913486 A | 2/2007 |
| CN | 102148746 A | 8/2011 |

OTHER PUBLICATIONS

Machine Translation and Abstract of Chinese Publication No. CN1859283, Nov. 8, 2006, 11 pages.
(Continued)

*Primary Examiner* — Brian S Roberts
*Assistant Examiner* — Abusayeed M Haque
(74) *Attorney, Agent, or Firm* — Conley Rose, P.C.

(57) ABSTRACT

A method of batch processing implemented using a pre-classification mechanism of a network interface controller is provided. The method includes receiving, by the pre-classification mechanism of the network interface controller, rules for populating a first receive queue and a second receive queue, receiving, by the pre-classification mechanism, packets corresponding to a first protocol intermingled with packets corresponding to a second protocol, and populating, by the pre-classification mechanism of the network interface controller, the first receive queue exclusively with the packets corresponding to the first protocol and the second receive queue exclusively with the packets corresponding to the second protocol based on the rules such that a central processing unit is able to obtain a first batch of the packets from the first receive queue and process each of the packets from the first batch using a same node graph path.

20 Claims, 9 Drawing Sheets

(51) Int. Cl.
*H04L 12/749* (2013.01)
*H04L 12/717* (2013.01)
*H04L 12/66* (2006.01)
*H04L 12/707* (2013.01)

(56) References Cited

U.S. PATENT DOCUMENTS

| | | | | |
|---|---|---|---|---|
| 2010/0054246 | A1* | 3/2010 | Shah | H04L 12/1863 370/390 |
| 2010/0115174 | A1* | 5/2010 | Akyol | G06F 13/385 710/316 |
| 2010/0131781 | A1* | 5/2010 | Memon | G06F 1/3209 713/310 |
| 2012/0120964 | A1* | 5/2012 | Koponen | H04L 41/0816 370/409 |
| 2012/0144018 | A1* | 6/2012 | Fried | H04L 12/6418 709/224 |
| 2012/0147898 | A1* | 6/2012 | Koponen | H04L 41/0893 370/422 |
| 2013/0155902 | A1* | 6/2013 | Feng | H04L 67/1031 370/255 |
| 2014/0258621 | A1* | 9/2014 | Bronson | G06F 12/0811 711/122 |
| 2014/0289436 | A1* | 9/2014 | Lewis | G06F 13/24 710/260 |
| 2015/0071076 | A1* | 3/2015 | Izhak-Ratzin | H04L 47/805 370/236 |
| 2018/0285151 | A1* | 10/2018 | Wang | G06F 9/4881 |

OTHER PUBLICATIONS

Machine Translation and Abstract of Chinese Publication No. CN1913486, Feb. 14, 2007, 8 pages.
Machine Translation and Abstract of Chinese Publication No. CN102148746, Aug. 10, 2011, 23 pages.
Foreign Communication From a Counterpart Application, PCT Application No. PCT/CN2018/084535, English Translation of International Search Report dated Jul. 27, 2018, 5 pages.
Han, et al., "Berkeley Extensible Software Switch (BESS)," http://span.cs.berkeley.edu/bess.html; last accessed Feb. 7, 2017, 1 page.
"Technology," downloaded from the internet 2071, https://fd.io/technology, last accessed Feb. 7, 2017, 4 pages.

* cited by examiner

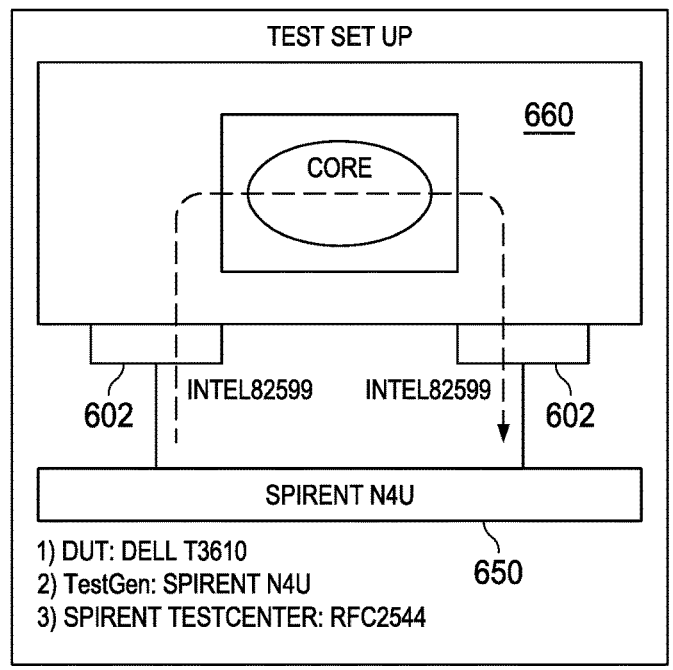
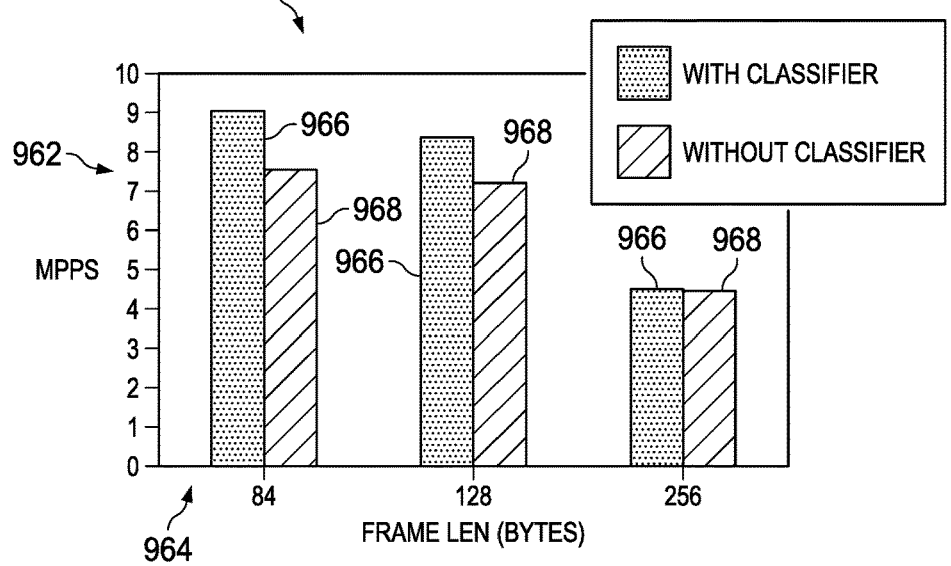

US 10,439,930 B2

PACKET BATCH PROCESSING WITH GRAPH-PATH BASED PRE-CLASSIFICATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Packet processing performance is a key factor for the success of software defined networking (SDN) and network function virtualization (NFV). In SDN and NFV, packet processing is performed using commodity central processing units (CPUs) coupled together with network interface controller (NICs).

To improve performance, a packet batch processing architecture using a node graph is widely accepted in the industry. During packet batch processing, a basic assumption is made that all of the packets in a single batch will go through the same node graph path. However, in practical applications the packets in one batch utilize different protocols and, as such, do not end up going through the same graph path.

SUMMARY

According to one aspect of the present disclosure, there is provided a method of batch processing implemented using a pre-classification mechanism of a network interface controller. The method includes receiving, by the pre-classification mechanism, rules for populating a first receive queue and a second receive queue, receiving, by the pre-classification mechanism, packets corresponding to a first protocol intermingled with packets corresponding to a second protocol, and populating, by the pre-classification mechanism, the first receive queue exclusively with the packets corresponding to the first protocol and the second receive queue exclusively with the packets corresponding to the second protocol based on the rules such that a central processing unit is able to obtain a first batch of the packets from the first receive queue and process each of the packets from the first batch using a same node graph path.

Optionally, in any of the preceding aspects, another implementation of the aspect provides populating the first receive queue exclusively with the packets corresponding to the first protocol and the second receive queue exclusively with the packets corresponding to the second protocol based on the rules such that following an initial cache miss each of the packets from the first batch that are subsequently processed experience a cache hit. Optionally, in any of the preceding aspects, another implementation of the aspect provides receiving the rules from an operator configuring the network interface controller. Optionally, in any of the preceding aspects, another implementation of the aspect provides receiving the rules from a rules creator within the central processing unit. Optionally, in any of the preceding aspects, another implementation of the aspect provides checking a packet header to distinguish the packets corresponding to the first protocol from the packets corresponding to the second protocol. Optionally, in any of the preceding aspects, another implementation of the aspect provides that the packets corresponding to the first protocol and the packets corresponding to the second protocol are each one of Internet Protocol version 4 (IPv4) packets, Internet Protocol version 6 (IPv6) packets, multi-protocol label switched (MPLS) packets, transmission control protocol (TCP) packets, and User Datagram Protocol (UDP) packets. Optionally, in any of the preceding aspects, another implementation of the aspect provides receiving, from the central processing unit, the packets after processing and then transmitting the packets to another device.

According to one aspect of the present disclosure, there is provided a server including a network interface controller having a pre-classification mechanism configured to receive packets corresponding to a first protocol intermingled with packets corresponding to a second protocol, and populate a first receive queue exclusively with the packets corresponding to the first protocol and a second receive queue exclusively with the packets corresponding to the second protocol. The server also includes a central processing unit operably coupled to the network interface controller and configured to obtain a first batch of the packets from the first receive queue, and process each of the packets from the first batch using a same first node graph path.

Optionally, in any of the preceding aspects, another implementation of the aspect provides a cache is operably coupled to the central processing unit, where each of the packets from the first batch processed after a cache miss in the cache experiences a cache hit. Optionally, in any of the preceding aspects, another implementation of the aspect provides that the central processing unit is configured to obtain a second batch of the packets from the second receive queue and process each of the packets from the second batch using a same second node graph path. Optionally, in any of the preceding aspects, another implementation of the aspect provides the pre-classification mechanism populates the first receive queue and the second receive queue by checking an ethertype in a packet header of each of the packets. Optionally, in any of the preceding aspects, another implementation of the aspect provides the packets corresponding to the first protocol and the packets corresponding to the second protocol are each one of Internet Protocol version 4 (IPv4) packets, Internet Protocol version 6 (IPv6) packets, multi-protocol label switched (MPLS) packets, transmission control protocol (TCP) packets, and User Datagram Protocol (UDP) packets. Optionally, in any of the preceding aspects, another implementation of the aspect provides the pre-classification mechanism is at least partially implemented in hardware. Optionally, in any of the preceding aspects, another implementation of the aspect provides the network interface controller includes an Ethernet port configured to receive the packets. Optionally, in any of the preceding aspects, another implementation of the aspect provides the central processing unit comprises a traffic path observer configured to monitor the packets received by the central processing unit and to transmit a report to an operator when a traffic pattern exceeds a predetermined threshold. Optionally, in any of the preceding aspects, another implementation of the aspect provides that the central processing unit comprises a traffic path observer and a rules creator, where the traffic path observer is configured to monitor the packets received by the central processing unit and to alert the rules creator when a traffic pattern exceeds a predetermined threshold, and where the rules creator is configured to generate new rules based on the alert and to instruct the pre-classification mechanism to start using the new rules for populating the first receive queue and the second receive queue. Optionally, in any of the preceding aspects, another implementation of the aspect provides that the network interface controller is configured to receive the packets from the central processing unit following processing and to transmit the packets as processed to another device.

According to one aspect of the present disclosure, there is provided a server including a network interface controller having a pre-classification mechanism configured to receive packets corresponding to a first protocol intermingled with packets corresponding to a second protocol, and populate a first receive queue exclusively with the packets corresponding to the first protocol and a second receive queue exclusively with the packets corresponding to the second protocol. The server also includes a central processing unit operably coupled to the network interface controller and configured to provide the network interface controller with rules for populating the first receive queue and the second receive queue, obtain a first batch of the packets from the first receive queue, and process each of the packets from the first batch using a same node graph path. The server also includes a main memory and a cache operably coupled to the central processing unit, where an instruction is retrieved from the main memory and stored in the cache following a cache miss, and wherein each of the packets from the first batch processed after the cache miss experiences a cache hit. Optionally, in any of the preceding aspects, another implementation of the aspect provides that the central processing unit comprises a traffic path observer configured to monitor the packets received by the central processing unit and to transmit a report to an operator when a traffic pattern exceeds a predetermined threshold. Optionally, in any of the preceding aspects, another implementation of the aspect provides that the central processing unit comprises a traffic path observer and a rules creator, wherein the traffic path observer is configured to monitor the packets received by the central processing unit and to alert the rules creator when a traffic pattern exceeds a predetermined threshold, and wherein the rules creator is configured to generate new rules based on the alert and to instruct the pre-classification mechanism to start using the new rules for populating the first receive queue and the second receive queue.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 6-8 collectively illustrate the testing of a server having a pre-classification mechanism in the network interface controller relative to a server without any pre-classification mechanism using a test set up.

FIG. 9 is a graph illustrating the results of testing the server having the pre-classification mechanism in the network interface controller and the server without any pre-classification mechanism.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a pre-classification mechanism implemented in a network interface controller that overcomes the inefficiencies of prior packet processing schemes. As will be more fully explained below, the pre-classification mechanism receives packets corresponding to a first protocol (e.g., IPv4) intermingled with packets corresponding to a second protocol (e.g., IPv6). Thereafter, the pre-classification mechanism populates each of the receive queues exclusively with a same type of packet. As such, a first receive queue is populated with only IPv4 packets and a second receive queue is populated with only IPv6 packets. Because all of the packets in each of the receive queues are of the same type, the central processing unit is able to process each of the packets from a first batch using a first node graph path and each of the packets from a second batch using a second node graph path. By processing in this manner, the number of packets benefitting from warming up the cache is substantially increased.

Figure 1:
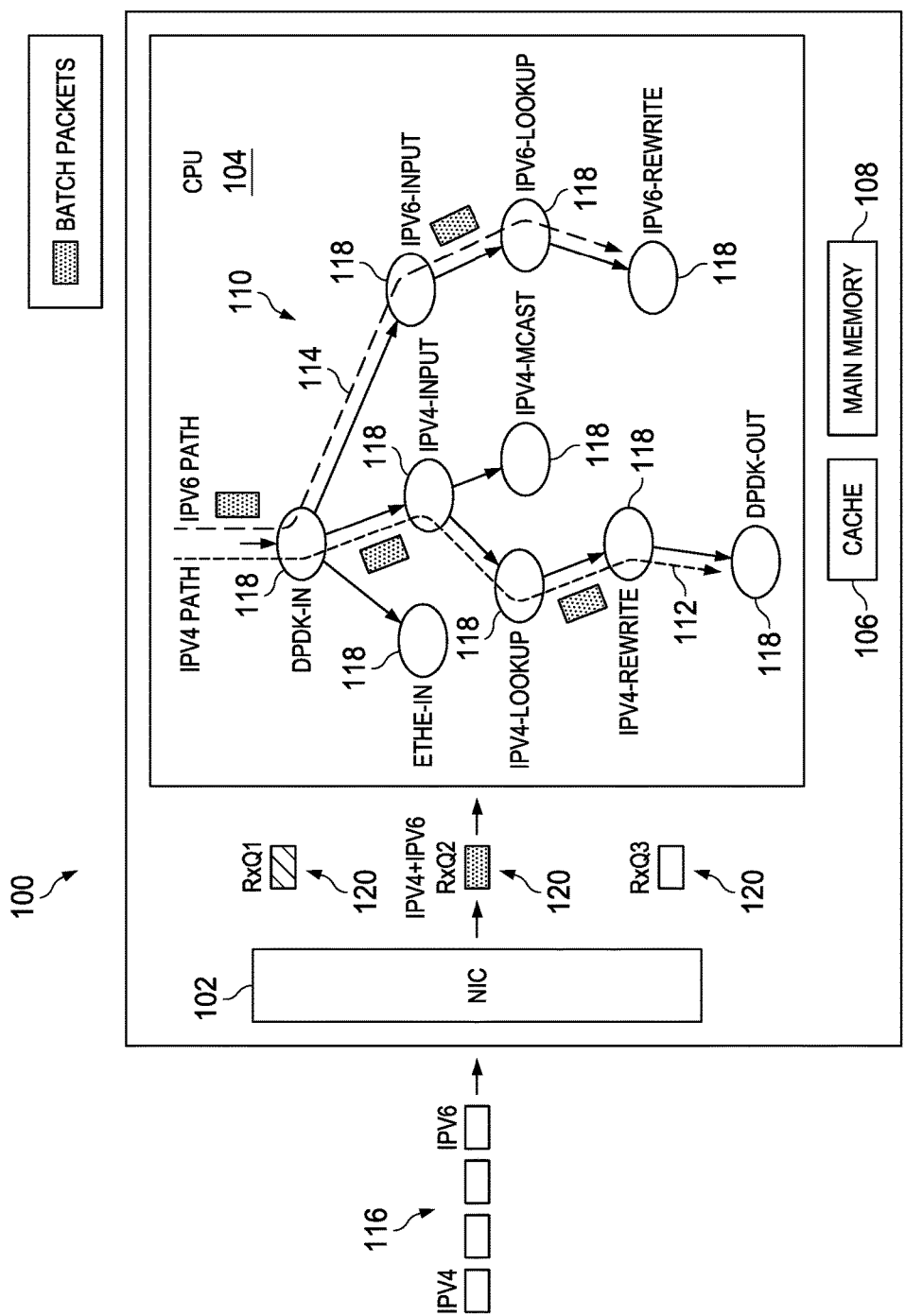
FIG. 1 is a schematic diagram illustrating the architecture of a server.

FIG. 1 is a schematic diagram illustrating the architecture of a server 100. As shown, the server 100 includes a network interface controller 102, a central processing unit 104, a cache 106, and a main memory 108. Those skilled in the art will appreciate that other components and/or devices may be included in the server 100 in practical applications. However, for the sake of brevity, these additional devices and/or elements will not be described in detail.

The network interface controller 102 is a computer hardware component that connects the server 100 to a computer network. The network interface controller 102 implements the electronic circuitry required to communicate using a specific physical layer and data link layer standard such as, for example, Ethernet, Fibre Channel, Wireless Fidelity (Wi-Fi), or Token Ring. This provides a base for a full network protocol stack, allowing communication among groups of computers in the computer network. The computer network may be the Internet, a wide area network (WAN), a local area network (LAN), a virtual private network (VPN), or other type of computer or telecommunications network allowing data to be shared. Communications may take place through routable protocols, such as Internet Protocol (IP).

The central processing unit 104 represents the electronic circuitry within the server 100 that carries out the instructions of a computer program or software by performing the basic arithmetic, logical, control and input/output (I/O) operations specified by the instructions. Principal components of the central processing unit 104 include, for example, the arithmetic logic unit (ALU) that performs arithmetic and logic operations, registers that supply operands to the ALU and store the results of ALU operations, and a control unit that orchestrates the fetching (from memory) and execution of instructions by directing the coordinated operations of the ALU, registers, and other components.

The central processing unit 104 may be a microprocessor, meaning the central processing unit 104 is contained on a single integrated circuit (IC) chip. An integrated circuit chip that contains the central processing unit 104 may also contain memory (e.g., main memory 108 and/or cache 106), peripheral interfaces, and other components of a computer. Such integrated devices may be referred to as a microcontroller or a system on a chip (SoC). While not shown in FIG. 1, the server 100 may employ a multi-core processor, which is a single chip containing two or more central processing units 104 referred to as cores.

The cache 106 is a hardware or software component that stores data so that future requests for that data can be served faster when compared to fetching the data from main memory 108. The data stored in the cache 106 may be the result of an earlier computation or the duplicate of data stored elsewhere. A cache hit occurs when the requested data is found in the cache 106, while a cache miss occurs when the data cannot be found in the cache 106. Cache hits are served by reading data from the cache 106, which is faster than re-computing a result or reading from a slower data store such as the main memory 108. Thus, the more requests that can be served from the cache 106, the faster a system performs. To be cost-effective and to enable the efficient use of data, the cache 106 is relatively small compared to the main memory 108. While a single cache 106 is shown, those skilled in the art will appreciate that the cache 106 may represent multiple caches organized in, for example, a hierarchy of caches.

The main memory 108 refers to the computer hardware devices used to store information (e.g., data, instructions, computer programs, software, etc.) for use in the server 100. The main memory 108 is synonymous with and may be referred to as primary storage. The main memory 108 may be of a variety of different types as will be more fully described below.

The server 100 is capable of processing network packets or, simply, packets. A typical packet contains control information and user data. The user data may also be known as the payload. The control information provides the information needed for delivering the payload. For example, the control information may include source and destination network addresses, error detection codes, and sequencing information. The control information may be found in a header and/or trailer of the packet.

Packet processing performance is a key factor for the success of SDN and NFV. In SDN and NFV, packet processing is performed using commodity CPUs (e.g., the central processing unit 104) connected to one or more network interface controllers (e.g., network interface controller 102). To improve processing performance, a packet batch processing architecture with a node graph 110 may be used. Packet batch processing utilizing the node graph 110 is widely accepted in the industry. Examples of packet batch processing architectures include the Berkeley Extensible Software Switch (BESS), which is a product of the University of California in Berkley, Calif., and fd.io, which is a product of The Linux Foundation of San Francisco, Calif.

To achieve suitable results, a basic assumption for a packet batch processing architecture is that all of the packets in one batch will go through the same node graph path. The node graph path is typically a series of nodes 118 determined by the packet header. For example, the node graph path 112 in FIG. 1 may be represented in the packet header of an Internet Protocol version 4 (IPv4) packet as: dpdk-in→ipv4-input→ipv4-lookup→ipv4-rewrite→dpdk-out. Likewise, the node graph path 114 of FIG. 1 may be represented in the packet header of an Internet Protocol version 6 (IPv6) packet as: dpdk-in→ipv6-input→ipv6-lookup→ipv6-rewrite. Other node graph paths for other packets may include, for example, ethe-in, ipv4-mcast, and so on.

Despite the above, in practical applications the packets received at one interface of the server 100 utilize more than one protocol (e.g., IPv4, IPv6, multi-protocol label switching (MPLS), transmission control protocol (TCP), User Datagram Protocol (UDP), etc.). FIG. 1 is used to illustrate this point. As shown in FIG. 1, a series of packets 116 is received by the network interface controller 102 of the server 100. The series of packets 116 includes IPv4 packets intermingled or mixed together with IPv6 packets. The network interface controller 102 places a batch of IPv4 and IPv6 packets into each of the receive queues 120, which are individually labeled RxQ1, RxQ2, and RxQ3. While those skilled in the art will appreciate that other batch sizes are possible, the batch size is 255 of each receive queue 120 is assumed to be 255 packets. Therefore, each receive queue 120 includes a total of 255 packets, some of which are IPv4 packets and some of which are IPv6 packets.

The central processing unit 104 uses, for example, a polling mode driver (not shown) to obtain a first batch of the packets from the receive queue 120 labeled RxQ1. For the purposes of illustration, assume that 140 of the packets in the first batch are IPv4 packets and the other 115 packets in the first batch are IPv6 packets. If the first packet in the batch is an IPv4 packet, processing will take place using the IPv4 node graph path 112. While processing the IPv4 packet in this example, the ipv4-input node 118 may request information (e.g., data requested by a client or user device) from the cache 106. If the requested information is not found in the cache, a cache miss occurs. As such, the ipv4-input node 118 has to obtain the information from the main memory 108. Once obtained from the main memory 108, the information is used to process the IPv4 packet. The information is also loaded into the cache 106 for future processing, which may be referred to as warming up the cache. Once the cache 106 is warmed up with the information used to process IPv4 packets, each of the remaining 139 IPv4 packets will benefit from the information now stored in the cache 106. Indeed, the subsequent 139 IPv4 packets need not access the main memory 108, which results in faster processing.

The IPv6 packets in the first batch are processed similarly to the IPv4 packets. When an IPv6 packet is encountered, the IPv6 packet is processed using the IPv6 node graph path 114. While processing the IPv6 packet in this example, the ipv6-input node 118 may request information from the cache 106. If the requested information is not found in the cache, a cache miss occurs. As such, the ipv6-input node 118 has to obtain the information from the main memory 108. Once obtained from the main memory 108, the information is used to process the IPv6 packet. The information is also loaded into the cache 106 for future processing. Once the cache 106 is warmed up with the information used to process the IPv6 packets, each of the remaining 114 IPv6 packets will benefit from the information now stored in the cache 106. Indeed, the subsequent 114 IPv6 packets need not access the main memory 108, which results in faster processing.

Because the packets found in each of the receive queues 120 are a mix of different types of packets (e.g., IPv4 packets and IPv6 packets) in FIG. 1, packet processing is inefficient. Indeed, only 139 of the IPv4 packets benefit from warming up with cache 106, and only 114 of the IPv6 packets benefit from warming up with cache 106. Moreover, the main memory 108 needs to be accessed at least twice, once to fetch the information needed to process the IPv4 packets and then again to fetch the information needed to process the IPv6 packets.

To overcome the inefficiencies of prior packet processing schemes, a pre-classification mechanism implemented in a network interface controller is provided. The pre-classification mechanism receives packets corresponding to a first protocol (e.g., IPv4) intermingled with packets corresponding to a second protocol (e.g., IPv6). Thereafter, the pre-classification mechanism populates each of the receive queues exclusively with a same type of packet. As such, a first receive queue is populated with only IPv4 packets and a second receive queue is populated with only IPv6 packets. Because all of the packets in each of the receive queues are of the same type, the central processing unit is able to process each of the packets from a first batch using a first node graph path and each of the packets from a second batch using a second node graph path. By processing in this manner, the number of packets benefitting from warming up the cache is substantially increased. Indeed, if a first packet from a first batch of the packets obtained from the receive queue 120 is an IPv4 packet, the packet is processed by the ipv4-input node 118. If a cache miss is experienced during such processing but the cache is warmed up after that, each of the 254 subsequent IPv4 packets from the first batch will benefit from the cache having been warmed up.

Figure 2:
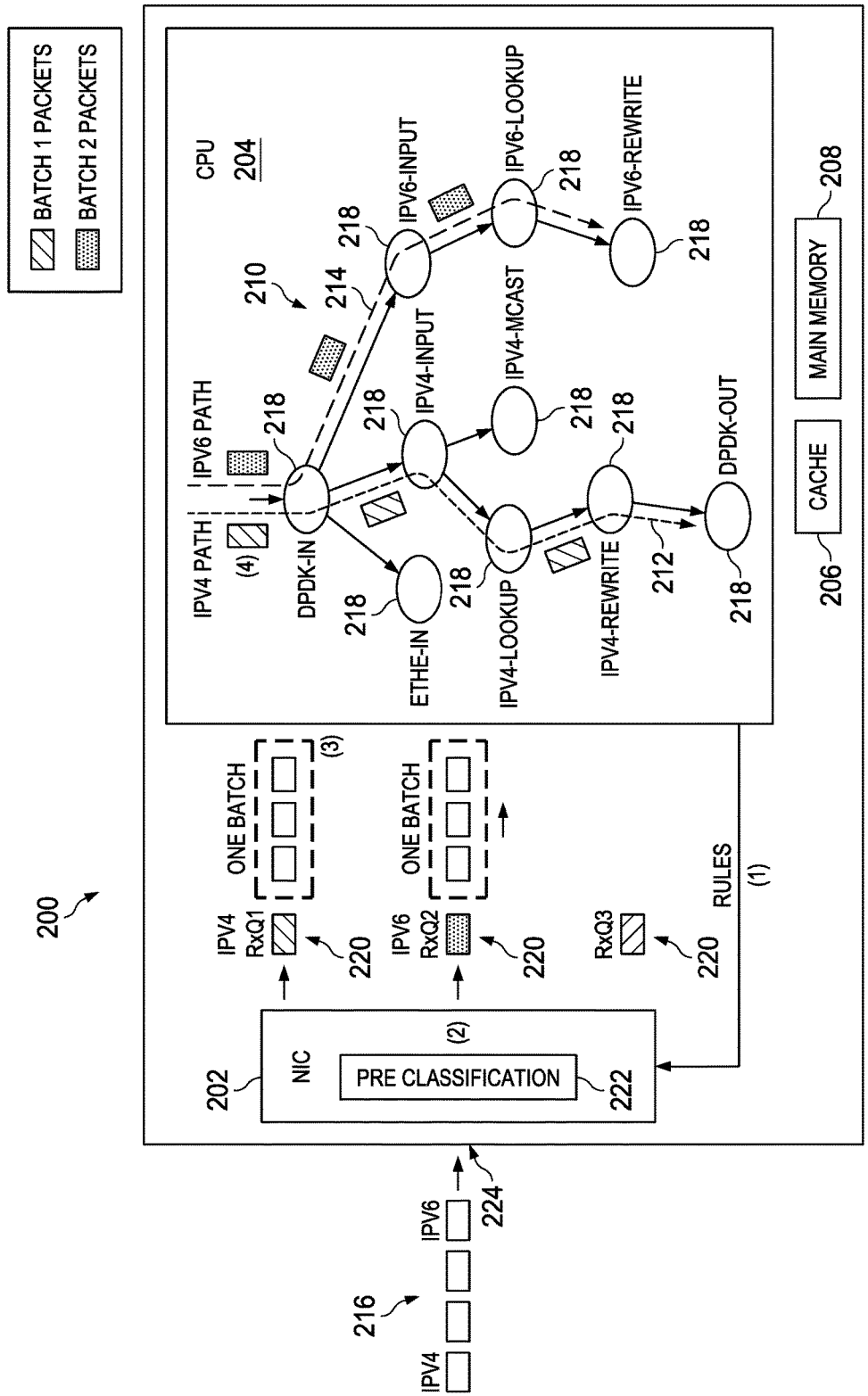
FIG. 2 is a schematic diagram illustrating an embodiment of the architecture of a server incorporating a pre-classification mechanism.

FIG. 2 is a schematic diagram illustrating an embodiment of the architecture of a server 200. As shown, the server 200 includes a network interface controller 202, a central processing unit 204, a cache 206, and a main memory 208. The central processing unit 204, cache 206, and main memory 208 of FIG. 2 are similar to the central processing unit 104, cache 106, and main memory 108 of FIG. 1. The server 200 of FIG. 2 utilizes a node graph 210, an IPv4 node graph path 212, an IPv6 node graph path 214, nodes 218, and receive queues 220 similar to the node graph 110, IPv4 node graph path 112, IPv6 node graph path 114, nodes 118, and receive queues 120 of FIG. 1.

The server 200 of FIG. 2 also includes a network interface controller 202. The network interface controller 202 is similar to the network interface controller 102 of FIG. 1. However, unlike the network interface controller 102 of FIG. 1, the network interface controller 202 of FIG. 2 includes a pre-classification mechanism 222. The pre-classification mechanism 222 may be implemented in hardware, software, or a combination of the two.

The pre-classification mechanism 222 receives the series of packets 216 of different types from the network interface controller 202. In an embodiment, the packets are received at an Ethernet port 224 of the network interface controller 202. Once received by the network interface controller 202, the packets are provided to the pre-classification mechanism 222. In an embodiment, the pre-classification mechanism 222 determines the type of each packet (e.g., whether the packet is an IPv4 or IPv6 packet) by parsing the header of the packet. Those skilled in the art will appreciate that the type of packet may be determined in different ways.

The pre-classification mechanism 222 is configured to receive rules from the central processing unit 204. The rules are used by the pre-classification mechanism 222 in populating the receive queues 220. By way of example, the rules may comprise the following: ipv4→RxQ1; ipv6→RxQ2. In this example, the pre-classification mechanism 222 will check an ethertype (e.g., a two octet field in an Ethernet frame) in the header of the packet to classify the packets and then populate the first receive queue 220 labeled RxQ1 with only IPv4 packets and the second receive queue 220 labeled RxQ2 with only IPv6 packets. The rules may be statically set by an operator of the server 200 or may be dynamic based on traffic pattern changes as will be more fully explained below. In addition, it is contemplated that the rules may be received from a source other than the central processing unit 204.

After the pre-classification mechanism 222 has received the rules from the central processing unit 204 or elsewhere, the pre-classification mechanism 222 applies the rules to populate or fill the receive queues 220 accordingly. In FIG. 2, the receive queue 220 labeled RxQ1 is populated exclusively with IPv4 packets, and the receive queue 220 labeled RxQ2 is populated exclusively with IPv6 packets. As such, the receive queue 220 labeled RxQ1 contains only packets corresponding to a first protocol and the receive queue 220 labeled RxQ2 contains only packets corresponding to a second protocol.

Once the packets have been classified and placed in batches in the receive queues 220 according to the type of protocol, the central processing unit 204 obtains batches from the receive queues 220 one at a time using, for example, a polling mode driver. A polling mode driver polls the queues of the network interface controller (NIC) 202 for receiving the incoming packets 216. For example, the central processing unit 204 retrieves a first batch of 255 IPv4 packets from the receive queue 220 labeled RxQ1. Because each of the packets in the batch is an IPv4 packet due to the operation of the pre-classification mechanism 222, all of the packets in the batch will be processed using the IPv4 node graph path 212 from the node graph 210. If, for example, the ipv4-input node 218 requests information from the cache 206 but experiences a cache miss, the ipv4-input node obtains the information from the main memory 208. Once obtained from the main memory 208, the information is used to process the IPv4 packet. The information is also loaded into the cache 206 for future processing. Once the cache 206 is warmed up with the information used to process the IPv4 packets, all of the remaining 254 IPv4 packets in the batch will benefit from the information now stored in the cache 206.

By processing packets using the pre-classification mechanism 222 in the server 200 of FIG. 2, all of the packets (e.g., 254 packets) in the batch that are processed after the cache 206 has been warmed up receive the benefit of the warmed up cache 206. In contrast, when processing packets using the server 100 of FIG. 1 only a portion of the packets (e.g., either 139 or 114 packets) in the batch that are processed after the cache 106 has been warmed up receive the benefit of the warmed up cache 106. Thus, the packet processing system of FIG. 2 utilizing the pre-classification mechanism 222 is more efficient than the packet processing system of FIG. 1. Indeed, the pre-classification mechanism 222 ensures that each packet in a batch obtained from one of the receive queues 220 will go through the same node graph path (e.g., node graph path 212 or 214), that more of the packets receive the benefit of the warmed up cache 206, and that the number of cache misses is reduced.

Figure 3:
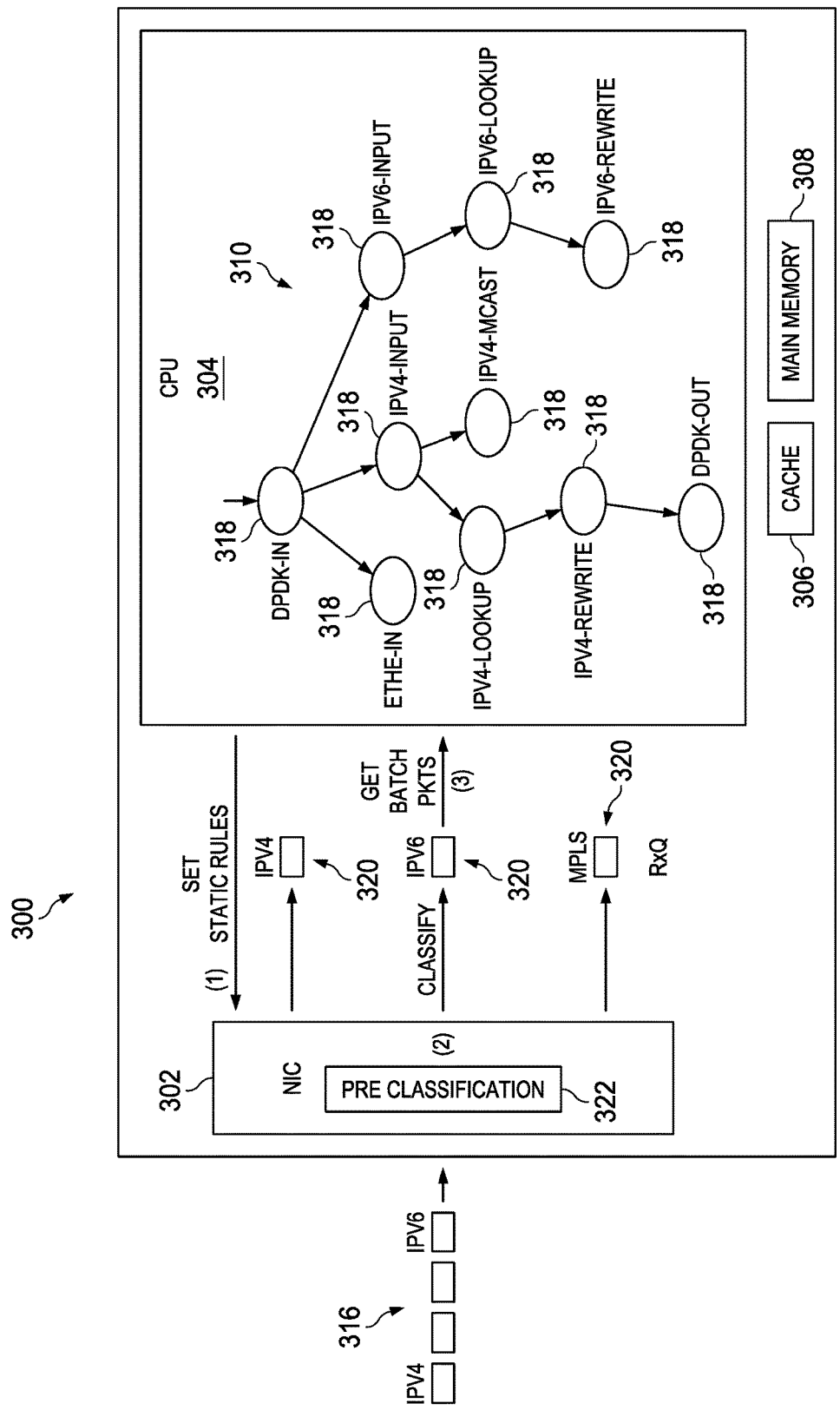
FIG. 3 is a schematic diagram illustrating an embodiment of the architecture of a server having a pre-classification mechanism and utilizing static rules.

FIG. 3 is a schematic diagram illustrating an embodiment of the architecture of a server 300. As shown, the server 300 includes a network interface controller 302 having a pre-classification mechanism 322, a central processing unit 304, a cache 306, a main memory 308, a node graph 310 containing various nodes 318, and receive queues 320. The server 300, network interface controller 302, pre-classification mechanism 322, central processing unit 304, cache 306, main memory 308, node graph 310, nodes 318, and receive queues 320 of FIG. 3 are similar to the server 100, 200, network interface controller 102, 202, pre-classification mechanism 222, central processing unit 104, 204, cache 106, 206, main memory 108, 208, node graph 110, 210, nodes 118, 218, and receive queues 120, 220 of FIGS. 1-2. The server 300 is configured to receive a series of packets 316 similar to the series of packets 116, 216 in FIGS. 1-2.

Unlike the rules provided by the central processing unit 204 to the network interface controller 202 of FIG. 2, the rules provided by the central processing unit 304 to the network interface controller 302 in FIG. 3 are static. By way of example, if the traffic pattern (e.g., the traffic flow type) is known a priori, then the rules may be set up in the system configuration and applied when the server 300 is booted up or started. If there are three types of packets in the traffic flow, such as IPv4 packets, IPv6 packets, and MPLS packets, the rules may be utilized by the pre-classification mechanism 322 to dispatch the packets into one of the three available receive queues 320 such that each of the receive queues contains only one type of packet.

The central processing unit 304, cache 306, and main memory 308 of FIG. 3 are similar to the central processing unit 104, 204, cache 106, 206, and main memory 108, 208 of FIGS. 1-2. The server 300 of FIG. 3 utilizes a node graph 310, an IPv4 node graph path 312, an IPv6 node graph path 314, nodes 318, and receive queues 320 similar to the node graph 110, 210, IPv4 node graph path 112, 212, IPv6 node graph path 114, 214, nodes 118, 218 and receive queues 120, 220 of FIGS. 1-2.

The server 300 of FIG. 3 also includes a network interface controller 302. The network interface controller 302 is similar to the network interface controller 202 of FIG. 2. Indeed, the network interface controller 302 of FIG. 3 includes a pre-classification mechanism 322 similar to the pre-classification mechanism 222 of FIG. 2. The pre-classification mechanism 322 may be implemented in hardware, software, or a combination of the two. In an embodiment, the rules may be received from an operator tasked with configuring the network interface controller 302.

Figure 4:
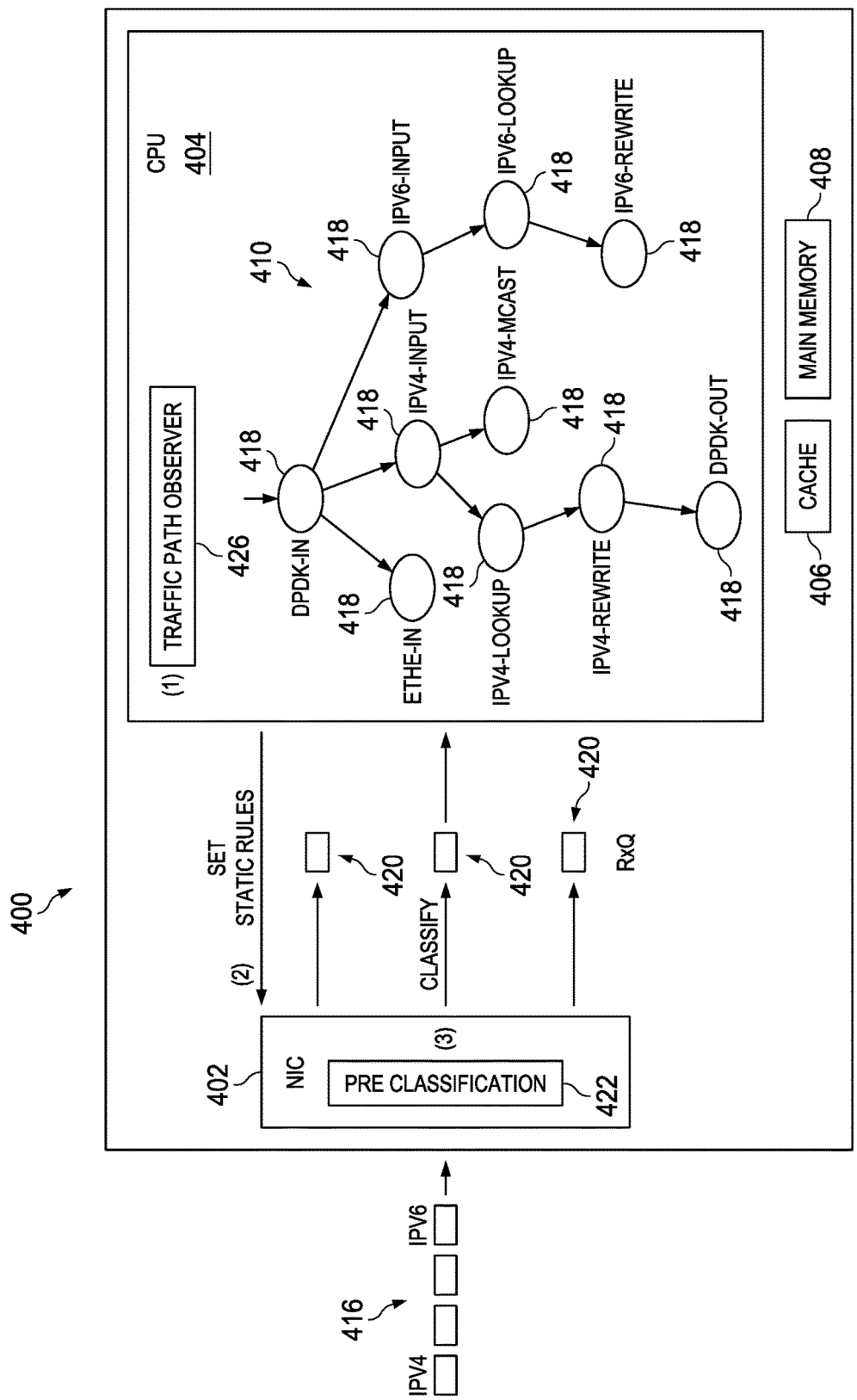
FIG. 4 is a schematic diagram illustrating an embodiment of the architecture of a server having a pre-classification mechanism and utilizing partially static rules.

FIG. 4 is a schematic diagram illustrating the architecture of server 400. As shown, the server 400 includes a network interface controller 402 having a pre-classification mechanism 422, a central processing unit 404, a cache 406, a main memory 408, a node graph 410 containing various nodes 418, and receive queues 420. The server 400, network interface controller 402, pre-classification mechanism 422, central processing unit 404, cache 406, main memory 408, node graph 410, nodes 418, and receive queues 420 of FIG. 4 are similar to the server 100, 200, 300, network interface controller 102, 202, 302, pre-classification mechanism 222, 322, central processing unit 104, 204, 304, cache 106, 206, 306, main memory 108, 208, 308, node graph 110, 210, 310, nodes 118, 218, 318, and receive queues 120, 220, 320 of FIGS. 1-3. The server 400 is configured to receive a series of packets 416 similar to the series of packets 116, 216, 316 in FIGS. 1-3.

Unlike the rules provided by the central processing unit 304 to the network interface controller 302 of FIG. 3, the rules provided by the central processing unit 404 to the network interface controller 402 in FIG. 4 are partially static. The rules are considered to be partially static due to the inclusion of a traffic path observer 426 within the central processing unit 404. By way of example, the traffic path observer 426 records the number of packets processed by each active node graph path (e.g., the node graph paths 212, 214 of FIG. 2). In an embodiment, the traffic path observer 426 is configured to send alerts and/or reports to the operator of the server 400 upon observing a traffic pattern change. The traffic pattern change may be, for example, that the IPv4 traffic has exceeded a pre-determined threshold (e.g., greater than forty percent (40%) of the total traffic for a period of five minutes). According to the alert and/or report, the operator of the server is able to adjust or change the rules and apply the new rules to the pre-classification mechanism 422.

Figure 5:
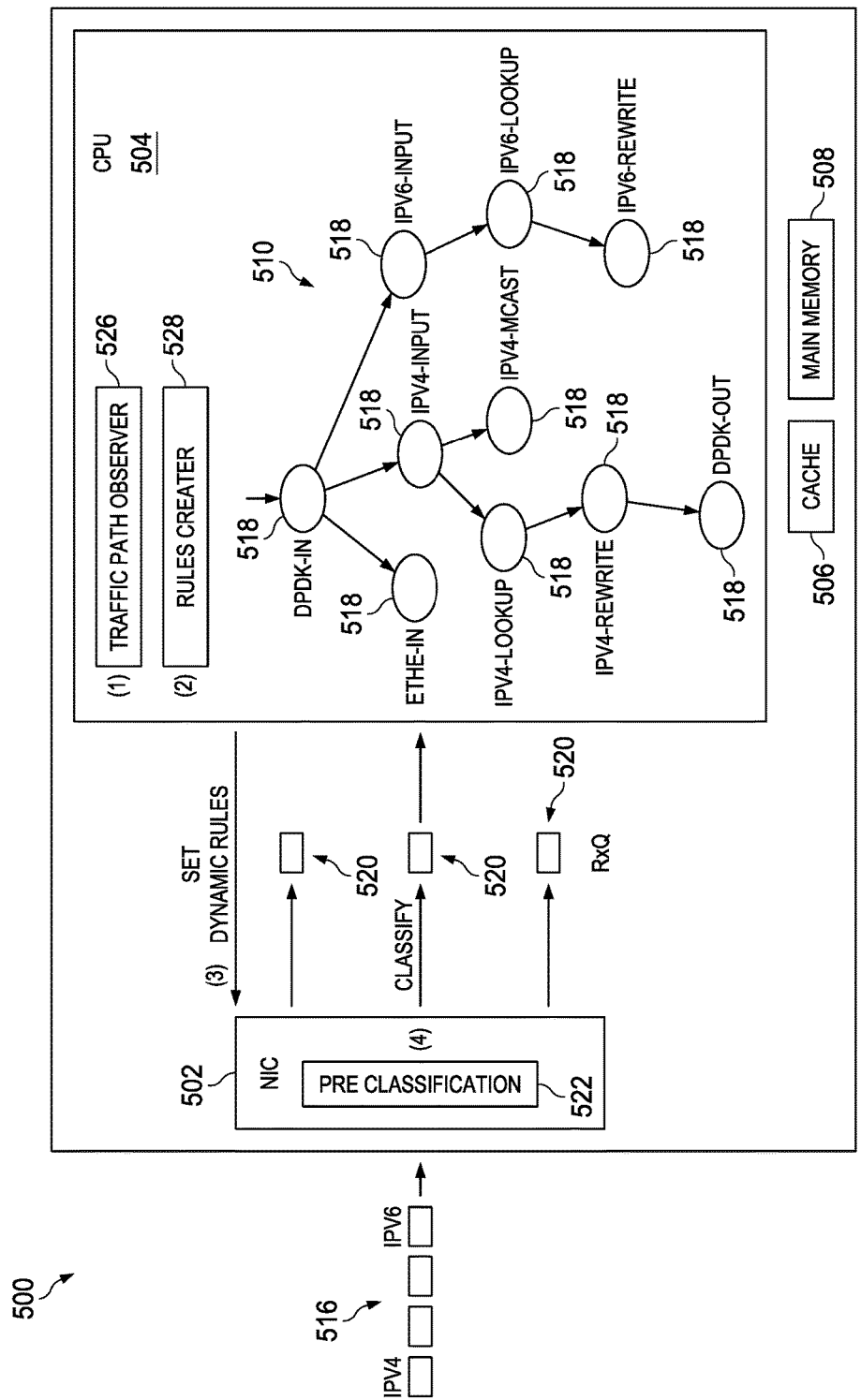
FIG. 5 is a schematic diagram illustrating an embodiment of the architecture of a server having a pre-classification mechanism and utilizing dynamic rules.

FIG. 5 is a schematic diagram illustrating the architecture of server 500. As shown, the server 500 includes a network interface controller 502 having a pre-classification mechanism 522, a central processing unit 504, a cache 506, a main memory 508, a node graph 510 containing various nodes 518, and receive queues 520. The server 500, network interface controller 502, pre-classification mechanism 522, central processing unit 504, cache 506, main memory 508, node graph 510, nodes 518, and receive queues 520 of FIG. 5 are similar to the server 100, 200, 300, 400, network interface controller 102, 202, 302, 402, pre-classification mechanism 222, 322, 422, central processing unit 104, 204, 304, 404, cache 106, 206, 306, 406, main memory 108, 208, 308, 408, node graph 110, 210, 310, 410, nodes 118, 218, 318, 418, and receive queues 120, 220, 320, 420 of FIGS. 1-4. The server 500 is configured to receive a series of packets 516 similar to the series of packets 116, 216, 316, 416 in FIGS. 1-4.

Unlike the rules provided by the central processing unit 404 to the network interface controller 402 of FIG. 4, the rules provided by the central processing unit 504 to the network interface controller 502 in FIG. 5 are dynamic. The rules are considered to be dynamic due to the inclusion of a traffic path observer 526 and a rules creator 528 within the central processing unit 504. The traffic path observer 526 in FIG. 5 is similar to the traffic path observer 426 of FIG. 4. By way of example, the traffic path observer 526 records the number of packets processed by each active node graph path (e.g., the node graph paths 212, 214 of FIG. 2). In an embodiment, the traffic path observer 526 is configured to send alerts and/or reports to the rules creator 528 upon observing a traffic pattern change. The traffic pattern change may be, for example, that the IPv4 traffic has exceeded a pre-determined threshold (e.g., greater than forty percent (40%) of the total traffic for a period of five minutes). According to the alert and/or report, the rules creator 528 is able to adjust or change the rules and apply the new rules to the pre-classification mechanism 522.

Figure 7:
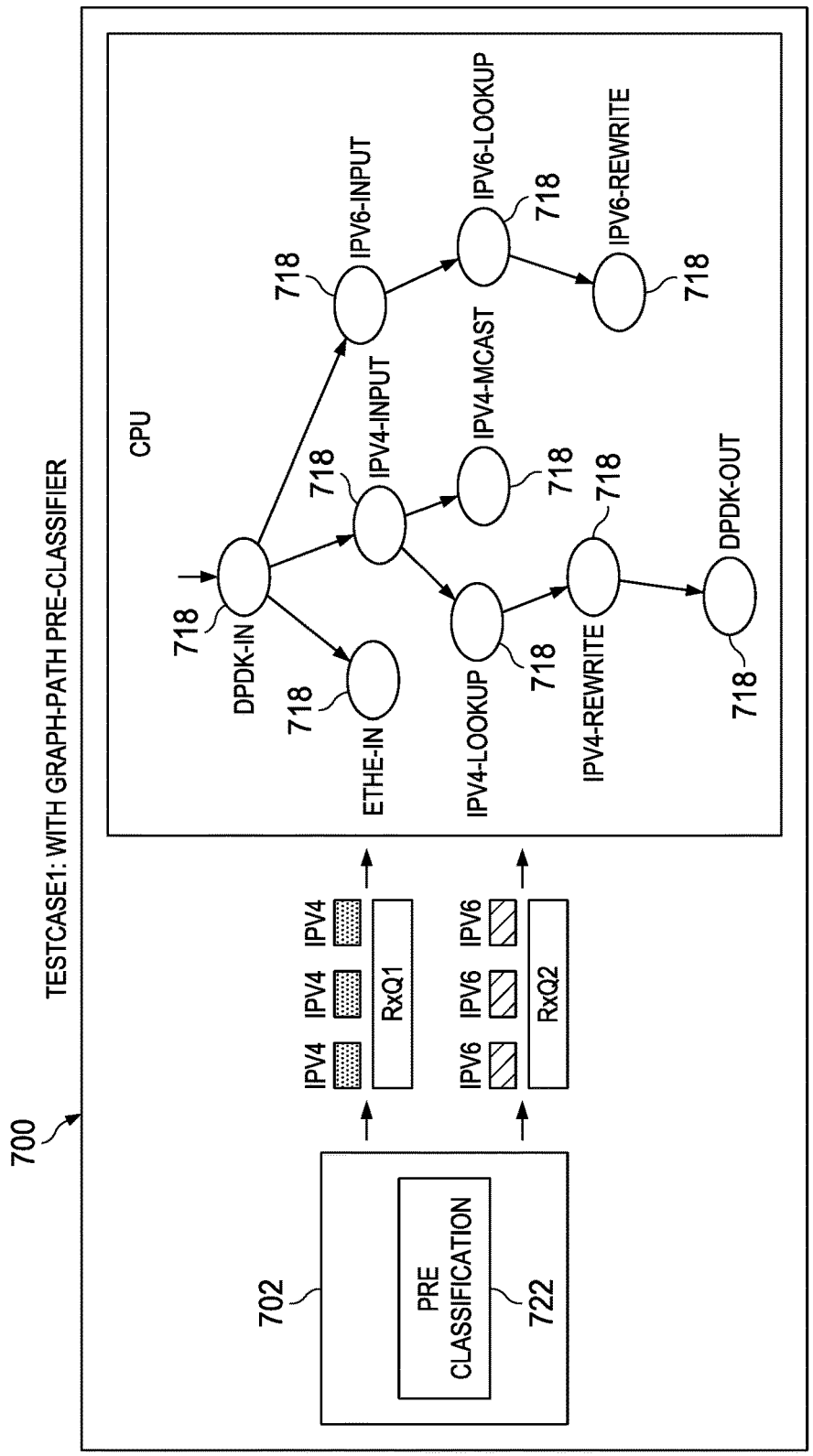
Figure 8:
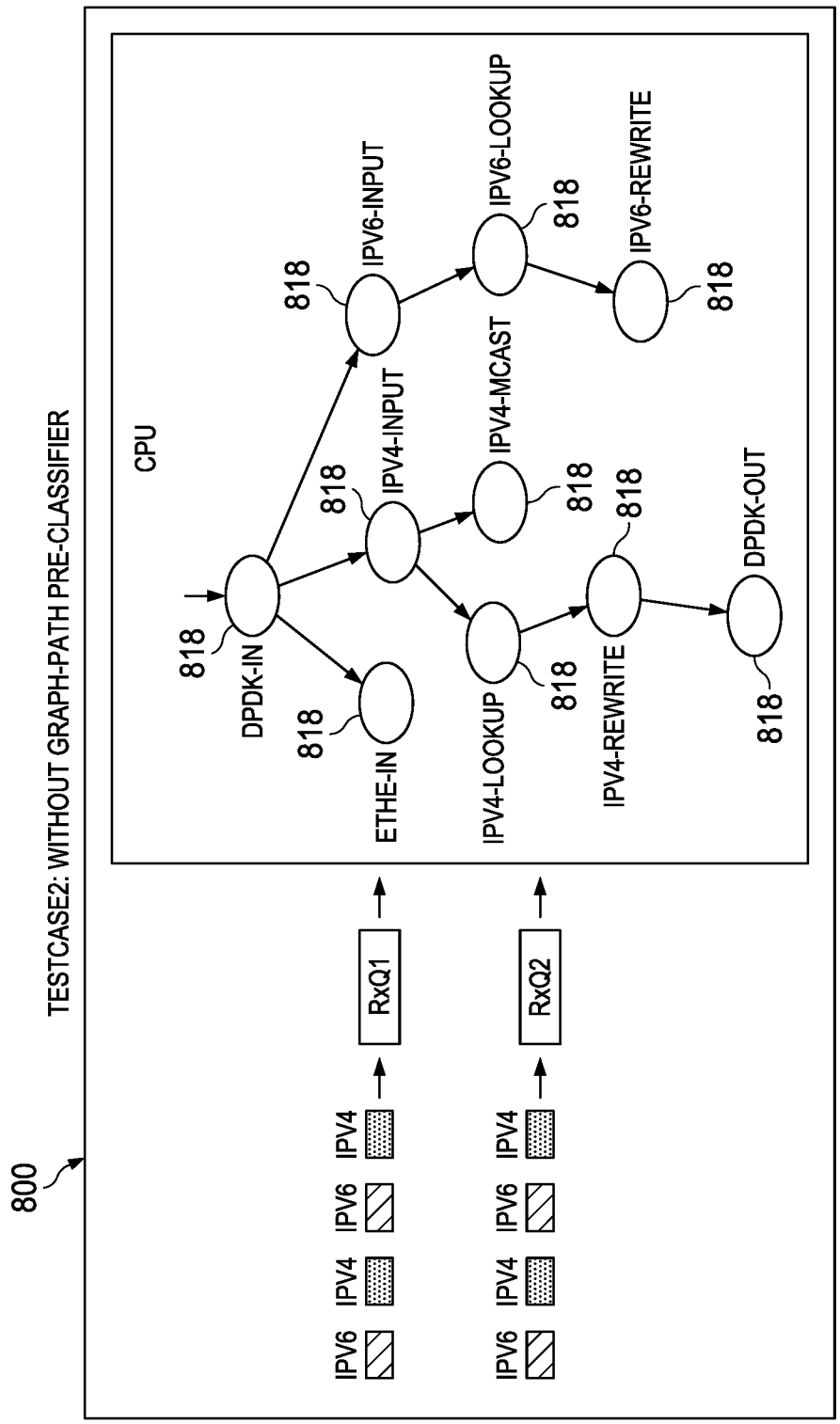

FIG. 6 illustrates a test set up 600 for testing a server 700 having a pre-classification mechanism 722 in the network interface controller 702 as depicted in FIG. 7 relative to a server 800 without any pre-classification mechanism as depicted in FIG. 8. The server 700 of FIG. 7 is similar to the servers 200, 300, 400, 500 of FIGS. 1-5 and the server 800 is similar to the server 100 of FIG. 1. Therefore, the components and functionality of the servers 700, 800 will not be repeated in detail for the sake of brevity. As shown, the server 700 includes a plurality of nodes 718 and the server 800 includes a plurality of nodes 818.

The test set up 600 of FIG. 6 includes a server under test 660, a pair of network interface controllers 602, and a test module 650. During testing, the server under test 660 is either server 700 of FIG. 7 or server 800 of FIG. 8. By way of example, the server under test 660 (a.k.a., device under test (DUT) in FIG. 6 may be a Dell® T3610 server commercially available from Dell, Inc., of Round Rock, Tex., in the United States. The test module 650 used during testing was the Spirent N4U model commercially available from Spirent Communications plc of Crawley, West Sussex, in the United Kingdom. In an embodiment, testing may be conducted pursuant to the methodology in the Request for Comments (RFC) 2544 using the Spirent N4U model. However, other testing methodologies may be used in other cases. The network interface controllers 602 used for testing, which are shown outside the server under test 660 in this embodiment, were the Intel 82599 model commercially available from the Intel Corporation of Santa Clara, Calif., in the United States.

FIG. 9 is a graph 900 illustrating the results of testing the server 700 of FIG. 7, which benefits from the inclusion of the pre-classification mechanism 722, relative to the server 800 of FIG. 8, which does not include any pre-classifier. The graph 900 includes a vertical axis 962 with units of million packets per second (Mpps) and a horizontal axis 964 with units of frame length (e.g., packet length) in bytes. As depicted by the graph 900, the performance of the server 700 with the pre-classification mechanism 722, which is depicted by columns 966, was superior to the performance of the server 800, which is depicted by columns 968, at the various frame lengths tested. Indeed, it was observed that use of the pre-classification mechanism 722 improved performance by 20% for IPv4 packets intermingled with IPv6 packets when a single IPv4 node graph path and a single IPv6 node graph path were used. At the frame length of 256 bytes, the throughput reached 10 Gigabits per second (Gps) during testing and there was less of a performance difference between using the pre-classification mechanism and not using the pre-classification mechanism.

Figure 10:
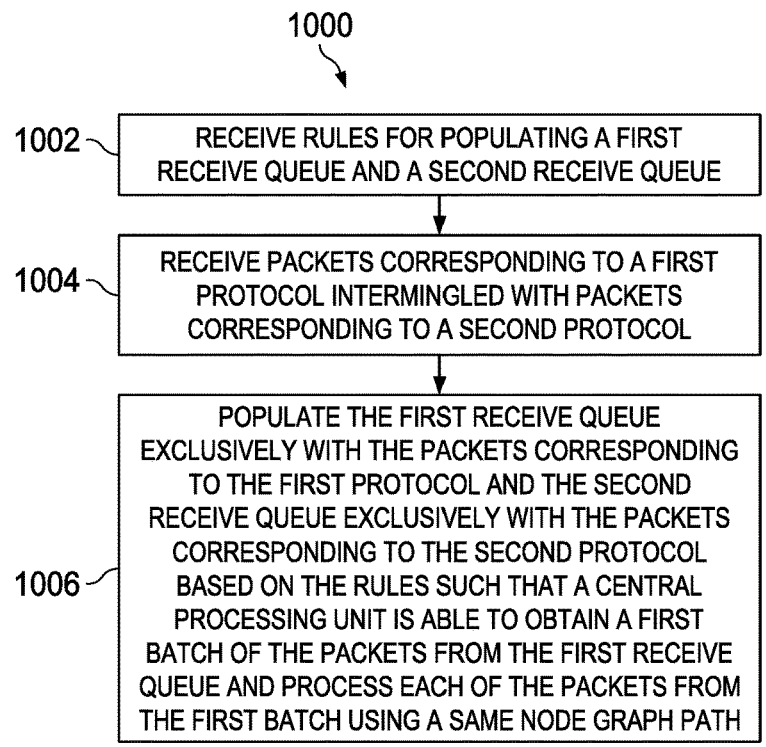
FIG. 10 is a flowchart of an embodiment of a method of batch processing that may be implemented using the pre-classification mechanism from a network interface controller.

FIG. 10 is a flowchart of an embodiment of a method 1000 of batch processing that may be implemented using, for example, the pre-classification mechanism 222, 322, 422, 522 from the network interface controller 202, 302, 402, 502 of FIGS. 2-5. In block 1002, the network interface controller receives rules for populating a first receive queue and a second receive queue (e.g., the first receive queue 220 labeled RxQ1 and the second receive queue 220 labeled RxQ2 in FIG. 2). In an embodiment, the rules are provided by an operator of the server or a rules creator (e.g., rules creator 528 of FIG. 5). In block 1004, packets corresponding to a first protocol (e.g., IPv4) intermingled with packets corresponding to a second protocol (e.g., IPv6) are received by the pre-classification mechanism. In block 1006, the first receive queue is populated exclusively with the packets corresponding to the first protocol and the second receive queue is populated exclusively with the packets corresponding to the second protocol based on the rules. As such, a central processing unit (e.g., central processing unit 204 of FIG. 2) is able to obtain a first batch of the packets from the first receive queue and process each of the packets from the first batch using a same node graph path.

Figure 11:
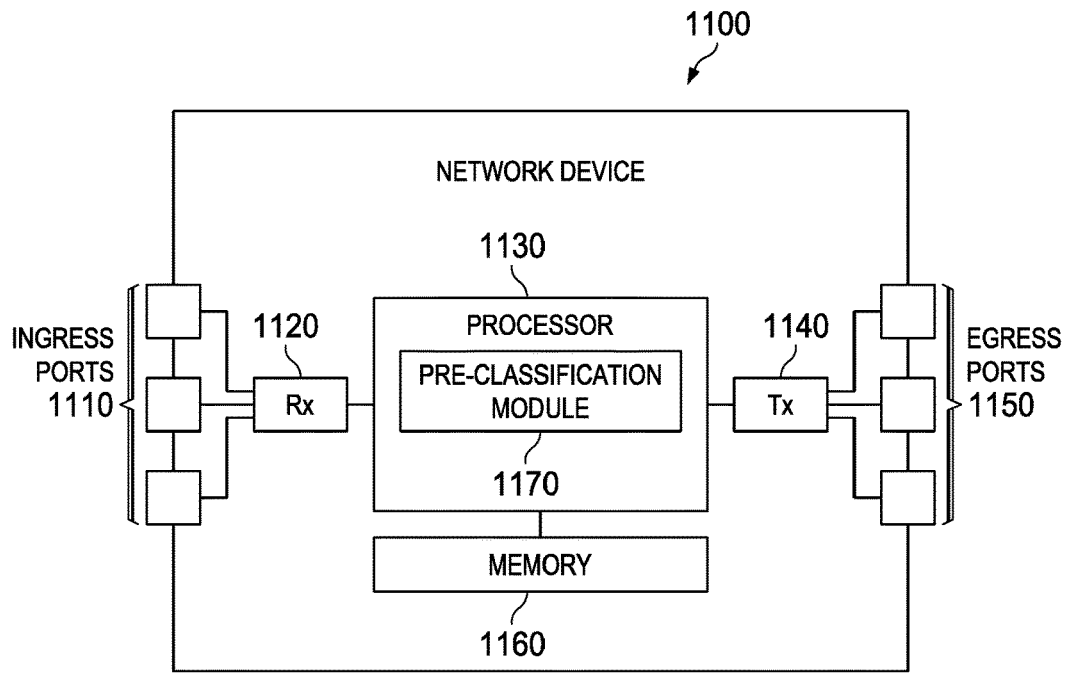
FIG. 11 is a schematic diagram of a network device suitable for implementing the inventive concepts disclosed herein.

FIG. 11 is a schematic diagram of a network device 1100 according to an embodiment of the disclosure. The device 1100 is suitable for implementing the components described herein (e.g., the servers 200, 300, 400, 500 of FIGS. 2-5). The device 1100 comprises ingress ports 1110 and receiver units (Rx) 1120 for receiving data; a processor, logic unit, or central processing unit 1130 to process the data; transmitter units (Tx) 1140 and egress ports 1150 for transmitting the data; and a memory 1160 for storing the data. The device 1100 may also comprise optical-to-electrical (OE) components and electrical-to-optical (EO) components coupled to the ingress ports 1110, the receiver units 1120, the transmitter units 1140, and the egress ports 1150 for egress or ingress of optical or electrical signals.

The processor 1130 is implemented by hardware and software. The processor 1130 may be implemented as one or more CPU chips, cores (e.g., as a multi-core processor), field-programmable gate arrays (FPGAs), application specific integrated circuits (ASICs), and digital signal processors (DSPs). The processor 1130 is in communication with the ingress ports 1110, receiver units 1120, transmitter units 1140, egress ports 1150, and memory 1160. The processor 1130 comprises a pre-classification module 1170. The pre-classification module 1170 implements the disclosed embodiments described above. For instance, the pre-classification module 1170 implements the functionality of the pre-classification mechanism 222, 322, 422, 522 of FIGS. 2-5. The inclusion of the pre-classification module 1170 therefore provides a substantial improvement to the functionality of the device 1100 and effects a transformation of the device 1100 to a different state. Alternatively, the pre-classification module 1170 is implemented as instructions stored in the memory 1160 and executed by the processor 1130.

The memory 1160 comprises one or more disks, tape drives, and solid-state drives and may be used as an overflow data storage device, to store programs when such programs are selected for execution, and to store instructions and data that are read during program execution. The memory 1160 may be volatile and non-volatile and may be read-only memory (ROM), random-access memory (RAM), ternary content-addressable memory (TCAM), and static random-access memory (SRAM).

The embodiments described herein provide numerous advantages. For example, because each of the packets in the batch of a receive queue are the same type, all of the packets will utilize the same node graph path in a node graph. Moreover, because all the packets are of the same type, each of the packets in the batch that follow an initial packet will benefit from the cache having been warmed up by the initial packet. Therefore, processing is more efficient relative to conventional methods of packet processing.

In an embodiment, the present disclosure provides a method of batch processing includes means for receiving rules for populating a first receive queue and a second receive queue, means for receiving packets corresponding to a first protocol intermingled with packets corresponding to a second protocol, and means for populating the first receive queue exclusively with the packets corresponding to the first protocol and the second receive queue exclusively with the packets corresponding to the second protocol based on the rules such that a central processing unit is able to obtain a first batch of the packets from the first receive queue and process each of the packets from the first batch using a same node graph path.

In an embodiment, the present disclosure provides a server including a network interface controlling means having a pre-classification mechanism configured to receive packets corresponding to a first protocol intermingled with packets corresponding to a second protocol, and populate a first receive queue exclusively with the packets corresponding to the first protocol and a second receive queue exclusively with the packets corresponding to the second protocol. The server also includes processing means operably coupled to the network interface controlling means and configured to obtain a first batch of the packets from the first receive queue, and process each of the packets from the first batch using a same first node graph path.

In an embodiment, the present disclosure provides a server including a network interface controlling means having a pre-classification mechanism configured to receive packets corresponding to a first protocol intermingled with packets corresponding to a second protocol, and populate a first receive queue exclusively with the packets corresponding to the first protocol and a second receive queue exclusively with the packets corresponding to the second protocol. The server also includes processing means operably coupled to the network interface controller and configured to provide the network interface controller with rules for populating the first receive queue and the second receive queue, obtain a first batch of the packets from the first receive queue, and process each of the packets from the first batch using a same node graph path. The server also includes memory means operably coupled to the processing means, where an instruction is retrieved from the memory means and stored following a memory means miss, and where each of the packets from the first batch processed after the memory means miss experiences a memory means hit.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of batch processing implemented using a pre-classification mechanism of a network interface controller, comprising:
   receiving, by the pre-classification mechanism of the network interface controller, rules for populating a first receive queue and a second receive queue;
   receiving, by the pre-classification mechanism, packets corresponding to a first protocol intermingled with packets corresponding to a second protocol; and
   populating, by the pre-classification mechanism of the network interface controller, the first receive queue exclusively with the packets corresponding to the first protocol and the second receive queue exclusively with the packets corresponding to the second protocol based on the rules such that:
      a central processing unit is able to obtain a first batch of the packets from the first receive queue and process each of the packets from the first batch using a same node graph path; and
      following an initial cache miss, each of the packets from the first batch that are subsequently processed experience a cache hit.

2. The method of batch processing of claim 1, further comprising receiving the rules from an operator configuring the network interface controller.

3. The method of batch processing of claim 1, further comprising receiving the rules from a rules creator within the central processing unit.

4. The method of batch processing of claim 1, further comprising checking a packet header to distinguish the packets corresponding to the first protocol from the packets corresponding to the second protocol.

5. The method of batch processing of claim 1, wherein the packets corresponding to the first protocol are Internet Protocol version 4 (IPv4) packets, Internet Protocol version 6 (IPv6) packets, multi-protocol label switched (MPLS) packets, transmission control protocol (TCP) packets, or User Datagram Protocol (UDP) packets.

6. The method of batch processing of claim 1, further comprising receiving, from the central processing unit, the packets after processing and then transmitting the packets to another device.

7. The method of batch processing of claim 1, wherein the packets corresponding to the second protocol are Internet Protocol version 4 (IPv4) packets, Internet Protocol version 6 (IPv6) packets, multi-protocol label switched (MPLS) packets, transmission control protocol (TCP) packets, or User Datagram Protocol (UDP) packets.

8. A server, comprising:
   a network interface controller having a pre-classification mechanism configured to:
      receive packets corresponding to a first protocol intermingled with packets corresponding to a second protocol; and
      populate a first receive queue exclusively with the packets corresponding to the first protocol and a second receive queue exclusively with the packets corresponding to the second protocol;
   a central processing unit operably coupled to the network interface controller and configured to:
      obtain a first batch of the packets from the first receive queue; and
      process each of the packets from the first batch using a same first node graph path; and
   a cache operably coupled to the central processing unit, wherein each of the packets from the first batch processed after a cache miss in the cache experiences a cache hit.

9. The server of claim 8, wherein the central processing unit is configured to obtain a second batch of the packets from the second receive queue and process each of the packets from the second batch using a same second node graph path.

10. The server of claim 8, wherein the pre-classification mechanism populates the first receive queue and the second receive queue by checking an ethertype in a packet header of each of the packets.

11. The server of claim 8, wherein the packets corresponding to the first protocol are Internet Protocol version 4 (IPv4) packets, Internet Protocol version 6 (IPv6) packets, multi-protocol label switched (MPLS) packets, transmission control protocol (TCP) packets, or User Datagram Protocol (UDP) packets.

12. The server of claim 8, wherein the pre-classification mechanism is at least partially implemented in hardware.

13. The server of claim 8, wherein the network interface controller includes an Ethernet port configured to receive the packets.

14. The server of claim 8, wherein the central processing unit comprises a traffic path observer configured to monitor the packets received by the central processing unit and to transmit a report to an operator when a traffic pattern exceeds a predetermined threshold.

15. The server of claim 8, wherein the central processing unit comprises a traffic path observer and a rules creator, wherein the traffic path observer is configured to monitor the packets received by the central processing unit and to alert the rules creator when a traffic pattern exceeds a predetermined threshold, and wherein the rules creator is configured to generate new rules based on the alert and to instruct the pre-classification mechanism to start using the new rules for populating the first receive queue and the second receive queue.

16. The server of claim 8, wherein the network interface controller is configured to receive the packets from the central processing unit following processing and to transmit the packets as processed to another device.

17. The server of claim 8, wherein the packets corresponding to the second protocol are Internet Protocol version 4 (IPv4) packets, Internet Protocol version 6 (IPv6) packets, multi-protocol label switched (MPLS) packets, transmission control protocol (TCP) packets, or User Datagram Protocol (UDP) packets.

18. A server, comprising:
a network interface controller having a pre-classification mechanism configured to:
receive packets corresponding to a first protocol intermingled with packets corresponding to a second protocol; and
populate a first receive queue exclusively with the packets corresponding to the first protocol and a second receive queue exclusively with the packets corresponding to the second protocol; and
a central processing unit operably coupled to the network interface controller and configured to:
provide the network interface controller with rules for populating the first receive queue and the second receive queue;
obtain a first batch of the packets from the first receive queue; and
process each of the packets from the first batch using a same node graph path; and
a main memory and a cache operably coupled to the central processing unit, wherein an instruction is retrieved from the main memory and stored in the cache following a cache miss, and wherein each of the packets from the first batch processed after the cache miss experiences a cache hit.

19. The server of claim 18, wherein the central processing unit comprises a traffic path observer configured to monitor the packets received by the central processing unit and to transmit a report to an operator when a traffic pattern exceeds a predetermined threshold.

20. The server of claim 18, wherein the central processing unit comprises a traffic path observer and a rules creator, wherein the traffic path observer is configured to monitor the packets received by the central processing unit and to alert the rules creator when a traffic pattern exceeds a predetermined threshold, and wherein the rules creator is configured to generate new rules based on the alert and to instruct the pre-classification mechanism to start using the new rules for populating the first receive queue and the second receive queue.

* * * * *